March 12, 1968
H. W. PINDER ETAL
3,372,451
CUTTING TOOLS FOR MACHINES
Filed July 20, 1965
3 Sheets-Sheet 1
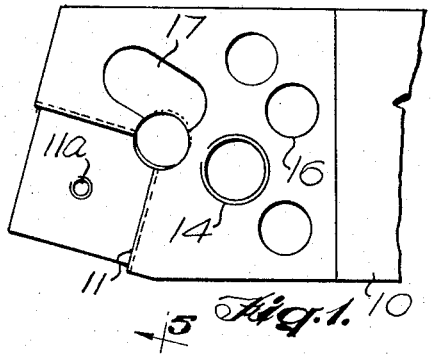
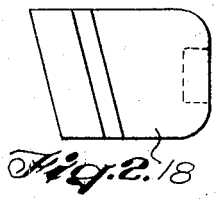
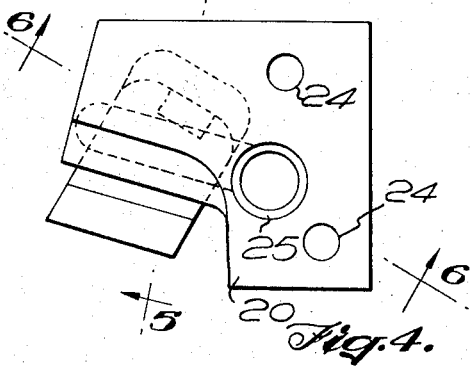
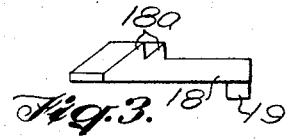
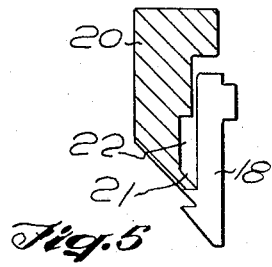
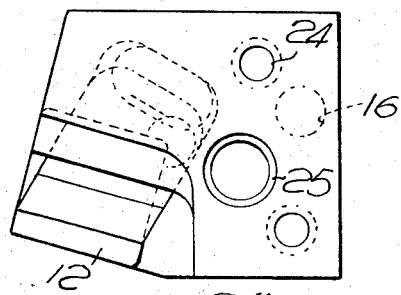
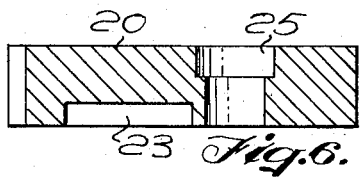
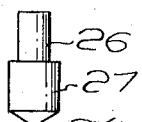
HAROLD W. PINDER
DERRICK MERRILL
STANLEY BEAL
INVENTORS
BY
Bierman + Bierman

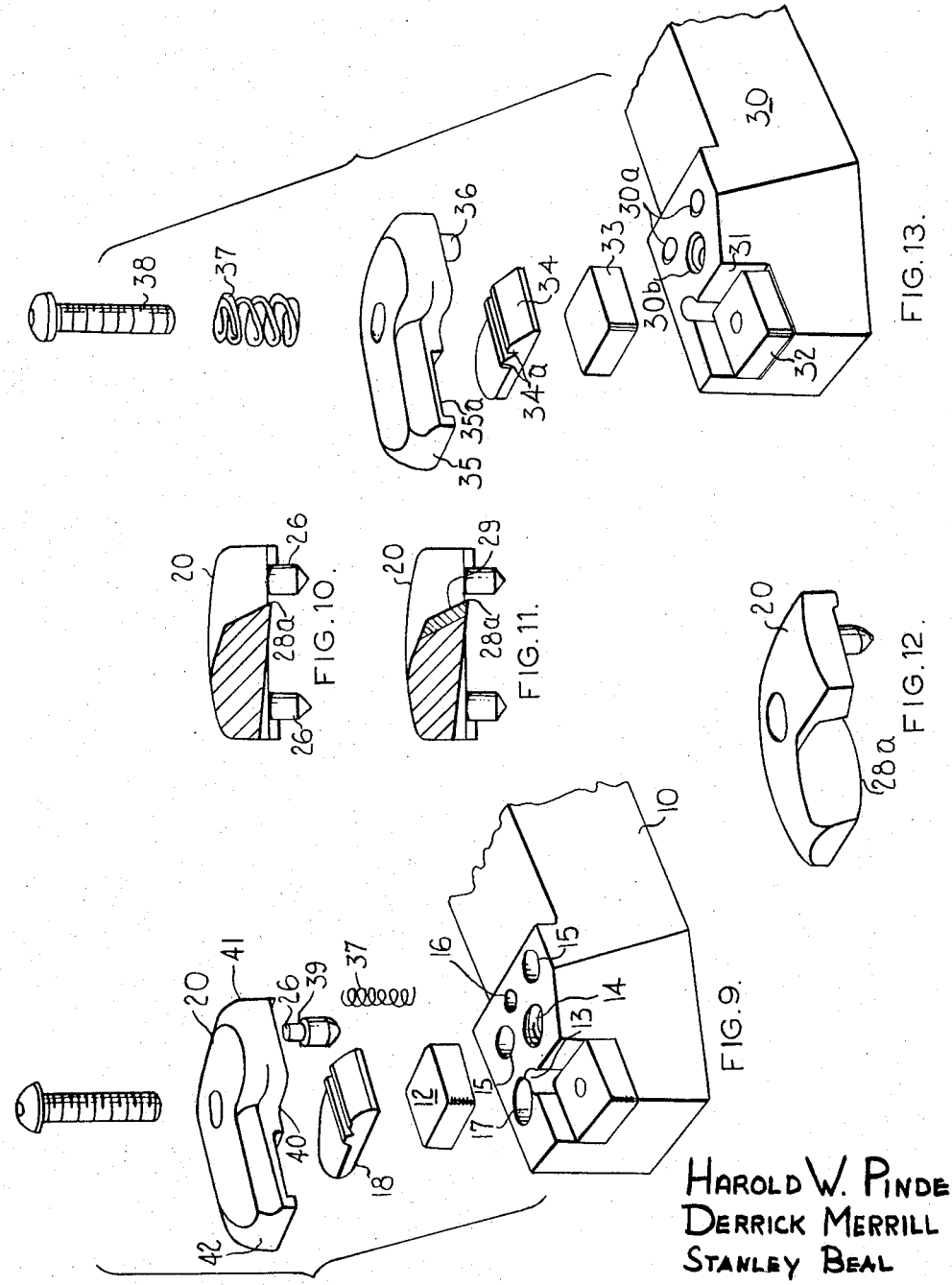

March 12, 1968  H. W. PINDER ETAL  3,372,451
CUTTING TOOLS FOR MACHINES
Filed July 20, 1965  3 Sheets-Sheet 3
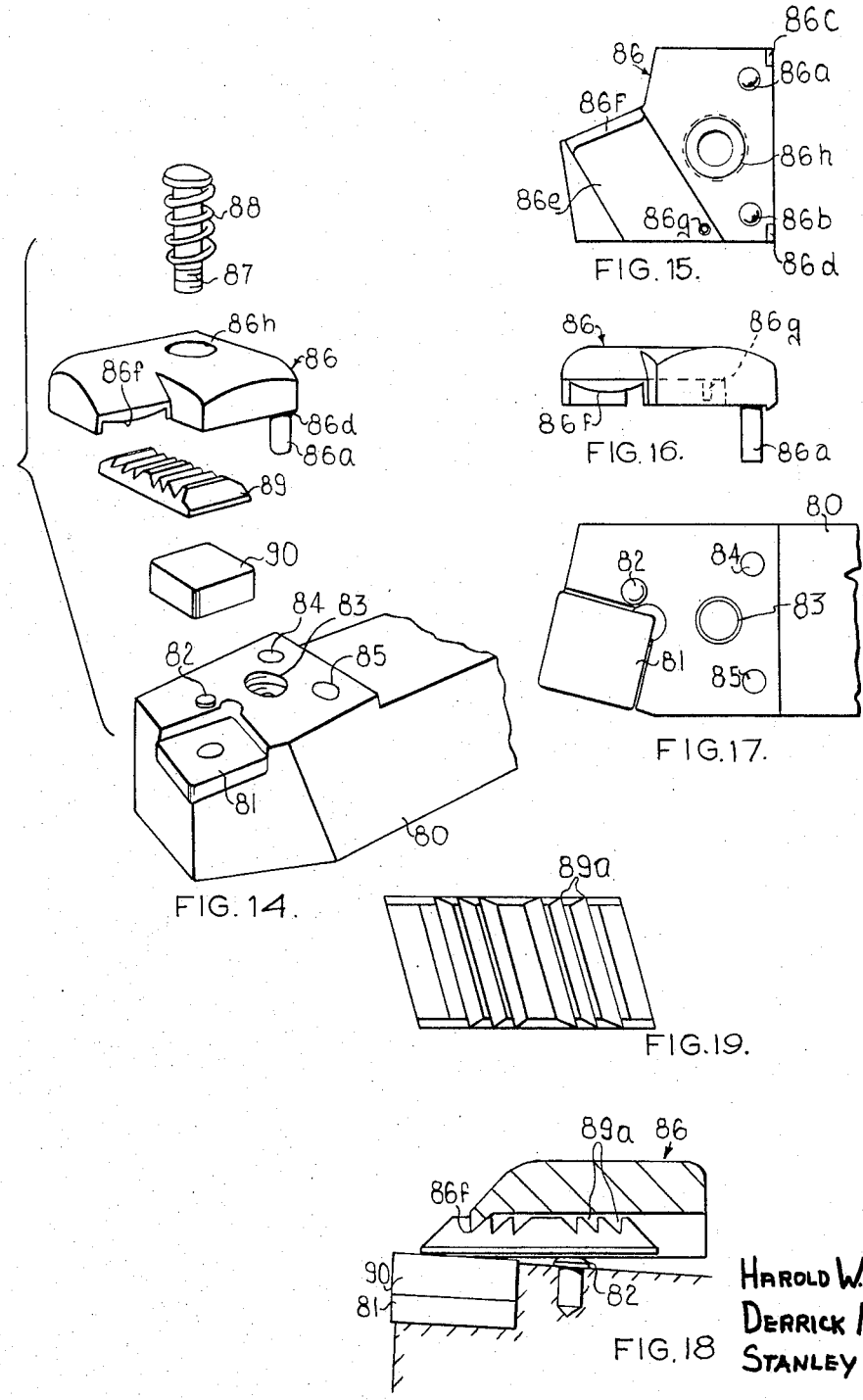
Harold W. Pinder
Derrick Merrill
Stanley Beal
INVENTORS
BY Bierman & Bierman

United States Patent Office 3,372,451
Patented Mar. 12, 1968

3,372,451
CUTTING TOOLS FOR MACHINES
Harold William Pinder, Stanley Beal, and Derrick Merrill, Sheffield, England, assignors to Cintride Limited, a corporation of Great Britain
Filed July 20, 1965, Ser. No. 473,340
Claims priority, application Great Britain, July 22, 1964, 29,861/64
4 Claims. (Cl. 29—96)

ABSTRACT OF THE DISCLOSURE

The present disclosure is drawn to a cutting tool combination wherein a clamp member holds a cutting insert in a rebate by a clamp fixing means and the clamp is resiliently acted upon by a spring member between the fixing means and one end of the clamp to maintain the clamp in engagement with the insert after partial release of the clamp fixing means.

---

This invention relates to cutting tools for machines, such as lathes of all kinds, milling machines, planing machines etc., of the kind, hereinafter termed the kind referred to, having a cutting insert adapted to be held in position in a recess in a stock or holder by means of a clamp, with or without a chip-breaker located between the clamp and the insert and secured by the clamp, the insert being adapted for "indexing" to present a fresh cutting edge, and being of course renewable from time to time while the chip-breaker is also renewable or interchangeable with others and may be positonally adjustable. Such inserts are frequently known or referred to as "throwaway tips."

With such cutting tools it is necessary from time to time to release the clamp in order to "index" or remove and replace the insert or adjust or replace the chip-breaker. Such clamp usually has fixing means in the form of a single clamping screw, the front end of the clamp engaging either directly with the insert or with the chip-breaker, and the rear end engaging the holder to provide a fulcrum for the clamping effect. On such occasions, accessibility is often very restricted, the holder may be on its side, or inverted, and consequently release of the clamp can easily result in the cutting insert slipping out of its recess in the holder from under the clamp or chip-breaker and dropping away or both the insert and chip-breaker falling away, or the chip-breaker becoming displaced relative to the clamp, with loss of time, as well as risking other possible complications.

It has been proposed to provide resilient means urging the chip-breaker against the clamping device so that the chip-breaker is kept in contact with the clamping device when the clamping device is loosened somewhat to remove or adjust the tool bit. Release of the clamp however is liable to release the tool insert as the resilient means lifts both the clamp and the chip-breaker out of contact therewith.

The object of the present invention is to facilitate manipulation for indexing, removing or fitting the cutting insert or tip and/or adjusting the chip-breaker with reduced risk of losing control of the cutting insert during clamping or unclamping prior to and after such manipulation.

According to the invention a cutting tool of this kind referred to is characterized by resilient means so arranged that upon partial release of the clamp-fixing means, the said resilient means urges the clamp in lever-like manner to apply resilient holding pressure to the insert.

The expression "insert" as distinct from "cutting insert" or tip is used herein to mean either the cutting insert or tip alone when the resilient holding pressure is applied by the clamp direct thereto, or a cutting insert plus chip-breaker when pressure is applied to the chip-breaker and through the latter to the cutting insert.

According to a preferred embodiment of the invention a cutting tool of the kind referred to is characterised in that the resilient means is so arranged as to urge the clamp resiliently towards the tool stock and into engagement at one end with the tool stock and at the other end with the insert or the chip-breaker, whereby such resilient engagement is maintained after any degree of partial release of the clamp-fixing means so as resiliently to hold the chip-breaker in lever-like manner against the cutting insert and thereby yieldably to hold it, and the chip-breaker where interposed, in place.

In the drawings filed herewith:

FIG. 1 is a plan of the working end of the stock or holder of a cutting tool made in accordance with one example of the invention;

FIG. 2 is a plan; and

FIG. 3 an elevation of a chip-breaker for use with the aforesaid stock or holder;

FIG. 4 is a plan of a clamping plate for use with the aforesaid stock or holder and with the chip-breaker shown in position;

FIGS. 5 and 6 are cross sections on lines 5—5 and 6—6 of FIG. 4, but with the chip-breaker not in section;

FIG. 7 is an assembled plan of the above parts with a cutting tip in position; and FIG. 8 is an elevation of a locating stud for use with the parts aforesaid;

FIG. 9 is an exploded isometric view of the tool shown in FIGS. 1 to 8;

FIGS. 10, 11 and 12 show modified constructions of the clamp;

FIG. 13 is an exploded view of a constructional modification of the tool shown in FIGS. 1 to 9;

FIG. 14 is an exploded isometric view of the working end of a cutting tool and its parts made in accordance with another example of the present invention.

FIG. 15 is an underneath plan of the clamp shown in FIG. 14.

FIG. 16 is a side elevation of the clamp shown in FIG. 14.

FIG. 17 is a plan of the end of the tool with the clamp, chip-breaker and tool insert removed.

FIG. 18 is a sectional elevation showing a modified chip-breaker and the holding action of the clamp.

FIG. 19 is a plan of the chip-breaker.

As shown in FIGS. 1 to 8, the cutting tool comprises a stock or holder 10 having a rectangular rebate 11 at one end with undercut faces at the back of the rebate. Such rebate is drilled and tapped at 11a for a fixing screw, spring pin or other suitable means by which a base plate (not shown) for the cutting tip 12 (FIG. 7) may be secured therein.

The stock or holder 10, in addition to the rebate is, formed with a clearance drilling 13, made before the cutting of the rebate and located in the angle thereof, with a tapped through hole 14 for the clamping screw; with shallow V-ended drilled locating recesses 15; a blind drilled recess 16 for a spring; and a shallow oval recess 17.

The chip-breaker 18 as shown in FIGS. 2 and 3 is formed at its front end with saw-tooth shaped ribs 18a on its upper face and a lug 19 at its rear end on its under face complementary to the oval recess 17 aforesaid in the holder.

The clamping plate 20 having ends 41 and 42 with a fulcrum at 40 therebetween as shown in FIGS. 4, 5, 6 and 7 has at its forward edge a tooth 21 complementary to the ribs 18 with a clearance 22 behind it and a blind shallow groove 23 adapted to form a housing for the chip-breaker. In the clamping plate are through holes 24 complementary to, but smaller than, the holes 15 in the holder and a clearance hole 25 complementary to the tapped hole 14 for the clamping screw (not shown). Locating studs 26 (FIG. 8) are formed with pointed ends 27 adapted to sit in the holes 15 of the stock the stems of the studs being adapted to fit in the holes 24 of the clamping plate. The length of the pointed ends 27 is such as to provide a shoulder just proud of the top of the stock, while the diameter of the pointed end is less than that of the holes 15 to allow some rocking movement of the clamping plate.

In use, the parts are assembled as shown in FIG. 7 with the chip-breaker 18 located in its groove 23, its lug 19 located in the oval recess 17 and with the tooth 21 of the clamping plate located behind one of the ribs 18 on the chip-breaker, the clamping plate is positionally located on the stock by the locating studs 26 which hold the rear end of the plate just above the top face of the stock and provide an abutment for the plate when the clamping screw is tightened, and thereby the clamp acts as a lever to enable the clamping screw to press the tooth 21 of the clamp firmly onto the chip-breaker to clamp it and the cutting insert in position. A coil spring (not shown) is located in the blind recess 16 to press against the underside of the clamping plate so that when the clamping screw is loosened somewhat it acts as a lever with its fulcrum against the screw to press its tooth 21 resiliently down onto the chip-breaker which is thereby pressed resiliently onto the cutting insert, the ends 27 of the studs lifting slightly in the holes 15.

When the clamping screw is loosened somewhat the tool bit or insert 12 may therefore be indexed or removed and replaced easily by manipulating it with the fingers, the leverage pressure from the spring being sufficient to prevent the insert from accidentally falling out of its rebate. If it is desired to adjust the position of the chip-breaker, the clamping screw has to be loosened sufficiently only to enable the other rib 18a to be brought into register with the tooth 21 of the clamping plate, the lug 19 and oval recess 17 preventing the chip-breaker from leaving its groove. If however it is desired to replace the chip-breaker, as when worn or broken, further slight loosening of the clamping screw enables the clamping plate to be lifted sufficiently to disengage the lug 19 from the oval recess 17. After a new chip-breaker has been inserted, a slight turn of the clamping screw will hold the chip-breaker from accidental release from its groove while the cutting insert is indexed or replaced and the chip-breaker set to the required position if such manipulation had not previously been effected. When the clamping screw is tightened, the shoulder of the studs 26 form an abutment 39 for the plate to form a lever pressing down onto the chip-breaker and cutting insert to clamp both those parts securely in position.

As shown in FIG. 10 the clamping 28 is shaped to engage direct with the cutting insert without the intervention of the chip-breaker. The clamping edge 28a (FIG. 12) being inversely arched, a feature which cannot easily be shown in FIGS. 10 and 11. As shown in FIG. 11 a facing 29 of hard material such as tungsten carbide is previously been effected. When the clamping screw is chip-breaker or to protect such part of the clamp from wear or damage.

As shown in FIG. 13 the tool comprises a stock or shank 30 having a rebate 31 in which is shown located a seat or plate 32. The cutting insert or bit 33 is of conventional shape while the chip-breaker 34 has ribs 34a forming alternative engagement positions for the clamp 35. Such clamp has a recess the front edge 35a of which is shaped to engage the ribs 34a aforesaid for locating the tip. On the underside of the clamp are locating studs 36 (one only of which is visible) complementary to a pair of sockets 30a formed in the top of the shank. In the clamp 35 is a rebated hole to receive a spring 37 and clamping screw 38 the latter passing through to engage a tapped hole 30b in the shank. The studs 36 engage the bottoms of their sockets to act as fulcrums.

In use, when the clamping screws 38 is tight the clamp 35 is held firmly down on the studs 36 and on the chip-breaker 34 which is located by the lip 35a and ribs 34a and which in turn is pressed firmly down onto the bit or insert 33 to secure it in its rebate 31. Loosening of the clamping screw does not completely release the chip-breaker or the bit since the spring 37 will hold the clamp 35 yieldably onto the chip-breaker and similarly will hold the chip-breaker onto the bit or insert. Such bit or insert can now be slid from under the chip-breaker for indexing or replacing without the chip-breaker leaving its recess. After such indexing or replacement of the bit the screw can be tightened again. To adjust or replace the chip-breaker the clamping screw will need to be loosened sufficiently to enable the lip 35a of the clamp to be disengaged from the complementary locating ribs 34a on the chip-breaker.

As shown in FIGS. 14 to 17 the shank of the tool 80 (see FIG. 17) is formed with a conventional angular rebate in which is located a tip seat 81 secured by a socket-headed screw, or other suitable means. Also in the upper face of the shank is located a fulcrum stud 82 the top of which is slightly domed (see also FIG. 18). Adjacent to the rebate and in a raised platform-like part is a screw threaded hole 83 and a pair of dowel holes 84, 85. The remaining parts of the assembly comprises a clamp 86, clamping screw 87, coil spring 88, chip-breaker 89, cutting insert 90 which however is shown for simplicity without any cutting edge formations.

As can be seen more clearly in FIGS. 15 and 16 the clamp 86 has a pair of dowels 86a, 86b complementary to the dowel holes aforesaid and at the rear edge of such plate are a pair of small projections 86c, 86d. The clamp is formed with a recess 86e to receive the chip-breaker 89, the front edge of which recess has an inclined lip 86f which is arched as can be seen in FIG. 16. A small pin 86g prevents the chip-breaker from slipping rearwardly from its recess. The hole 86h in the clamp for the clamping screw is recessed to house the spring 88 so that the spring is completely contained therein when the screw is fully tightened. The chip-breaker 89 is transversely grooved at 89a to provide three alternative positions of setting and is reversible. The grooves in the top of the chip-breaker at the two ends may be at different distances from the adjacent ends as shown in FIGS. 18 and 19 so as to provide six possible positions instead of three for setting for the working end of the breaker relative to the generation of the cuttings which is adapted to break up.

In use, because the spring 88 is wholly housed in the rebate 86h, the head of the clamping screw can be tightened onto the top of the clamp to press the front edge of the clamps onto the chip-breaker which as seen in FIG. 18 is slightly tilted by reason of the fulcrum stud 82 and thereby the front edge of the chip-breaker 89 presses onto the cutting insert 90 to hold it down onto the tip seat 81 and against displacement in its rebate. If the clamping screw is turned to release the clamp, the spring still urges the clamp onto the chip-breaker and the small projections 86c, 86d aforesaid provide a rear abutment for the clamp to ensure that whether the screw is fully tightened or eased off, an effective holding pressure at the front of the clamp is obtained.

When the screw is eased off and the insert loosened and removed from its seat there would be the possibility of the chip-breaker slipping out between the clamp 86 and stock 80. This is prevented however by proportioning the parts so that when the insert is removed the rear end of 89 engages the underside of 86 and is thus held securely in a slightly tilted position.

What we claim is:

1. A cutting tool comprising a stock having a rebate adapted to receive an insert, a clamp having two ends, said insert engaged near one of said ends and said stock engaged near the other of said ends, a fulcrum between said ends, releasable clamp fixing means on said clamp between said fulcrum and said one end, resilient means urging said clamp to rock on said fulcrum into engagement with said insert, whereby said engagement is maintained after partial release of said clamp fixing means.

2. A cutting tool according to claim 1 wherein said resilient means comprises a spring between said stock and said clamp and positioned between said other end and said fulcrum, and a locating means for said spring on at least one of said stock and said clamp.

3. A tool according to claim 1 wherein said resilient means comprises an abutment on an end of said fixing means remote from said clamp, and a spring on said fixing means between said abutment and said clamp.

4. A cutting tool according to claim 1 wherein said resilient means is a multi-convoluted spring in a countersunk hole in said clamp, a bolt having a head in said hole, said head engaging the upper surface of said clamp.

References Cited

UNITED STATES PATENTS

| | | | |
|---|---|---|---|
| 2,595,090 | 4/1952 | Middleton | 29—96 |
| 2,860,402 | 11/1958 | Proksa | 29—96 |
| 2,911,707 | 11/1959 | Almen | 29—96 |
| 2,930,111 | 3/1960 | St. Clair | 29—96 |
| 3,124,866 | 3/1964 | Novkov | 29—96 |
| 3,216,086 | 11/1965 | Kryszek | 29—96 |
| 3,252,202 | 5/1966 | Bullard et al. | 29—96 |

FOREIGN PATENTS 964,419   7/1964   Great Britain.

HARRISON L. HINSON, *Primary Examiner.*